(12) United States Patent
Kariyama et al.

(10) Patent No.: US 10,940,913 B2
(45) Date of Patent: *Mar. 9, 2021

(54) BICYCLE HYDRAULIC OPERATING SYSTEM

(71) Applicant: Shimano Inc., Osaka (JP)

(72) Inventors: Osamu Kariyama, Osaka (JP); Takahiro Yamashita, Osaka (JP); Masahiro Nakakura, Osaka (JP)

(73) Assignee: Shimano Inc., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/563,668

(22) Filed: Sep. 6, 2019

(65) Prior Publication Data

US 2019/0389533 A1 Dec. 26, 2019

Related U.S. Application Data

(60) Continuation of application No. 15/968,483, filed on May 1, 2018, which is a division of application No.
(Continued)

(51) Int. Cl.
*B62L 3/02* (2006.01)
*F16D 55/22* (2006.01)
(Continued)

(52) U.S. Cl.
CPC .............. *B62L 3/023* (2013.01); *B60T 7/102* (2013.01); *B60T 11/16* (2013.01); *B60T 17/04* (2013.01);
(Continued)

(58) Field of Classification Search
CPC ....... B62L 3/023; B62K 23/06; F16D 55/228; F16D 55/22; B60T 17/043; B60T 11/16; B60T 17/04; B60T 7/102
See application file for complete search history.

(56) References Cited

U.S. PATENT DOCUMENTS

| 4,176,886 A | 12/1979 | Watanabe |
| 4,456,310 A | 6/1984 | Hayashi et al. |
| 4,494,800 A | 1/1985 | Hayashi |
| 4,598,954 A | 7/1986 | Hayashi |

(Continued)

FOREIGN PATENT DOCUMENTS

| CN | 101386330 A | 3/2009 |
| DE | 102 19 496 A1 | 11/2003 |

(Continued)

*Primary Examiner* — Xuan Lan Nguyen
(74) *Attorney, Agent, or Firm* — Global IP Counselors, LLP

(57) ABSTRACT

An actuating device is part of a bicycle hydraulic operating system that also includes an additional actuating device and a hydraulic operated device. The hydraulic operated device includes a slave cylinder fluidly connected to an additional master cylinder of the additional actuating device such that operation of an additional operating member of the additional actuating device moves the slave piston. The actuating device includes an operating member, a master cylinder, a master piston and a fluid port. The fluid port fluidly connects the master cylinder to the slave fluid port such that operation of the operating member moves the slave piston. The actuating device has no fluid reservoir. The master cylinder of the actuating device is fluidly connected to the additional master cylinder of the additional actuating device at a point upstream of the fluid port with respect to a flow of hydraulic fluid towards the hydraulic operated device.

7 Claims, 12 Drawing Sheets

Related U.S. Application Data

14/310,670, filed on Jun. 20, 2014, now Pat. No. 9,994,282.

(51) Int. Cl.
    *B60T 7/10*         (2006.01)
    *B60T 11/16*       (2006.01)
    *B60T 17/04*       (2006.01)
    *F16D 55/228*     (2006.01)
    *B62K 23/06*       (2006.01)

(52) U.S. Cl.
    CPC ............ *B60T 17/043* (2013.01); *B62K 23/06* (2013.01); *F16D 55/22* (2013.01); *F16D 55/228* (2013.01)

(56) References Cited

U.S. PATENT DOCUMENTS

| | | |
|---|---|---|
| 4,703,839 A | 11/1987 | Nakano et al. |
| 4,921,081 A | 5/1990 | Chilcote |
| 5,094,322 A | 3/1992 | Casillas |
| 6,651,790 B2 | 11/2003 | Juan |
| 7,461,724 B2 | 12/2008 | Nago |
| 7,497,309 B2 | 3/2009 | Chen |
| 7,938,234 B2 | 5/2011 | Jinbo et al. |
| 8,201,670 B2 | 6/2012 | Tetsuka et al. |
| 2003/0121736 A1 | 7/2003 | Lumpkin |
| 2006/0185940 A1 | 8/2006 | Tsai |
| 2009/0140507 A1 | 6/2009 | Chen |

FOREIGN PATENT DOCUMENTS

| | | |
|---|---|---|
| EP | 2 336 017 A1 | 6/2011 |
| JP | 2009-234501 A | 10/2009 |

BICYCLE HYDRAULIC OPERATING SYSTEM

CROSS-REFERENCE TO RELATED APPLICATIONS

This application is a continuation application of U.S. patent application Ser. No. 15/968,483 filed on May 1, 2018, which in turn is a divisional application of U.S. patent application Ser. No. 14/310,670 filed on Jun. 20, 2014. The entire disclosures of U.S. patent application Ser. Nos. 14/310,670 and 15/968,483 are hereby incorporated herein by reference.

BACKGROUND

Technical Field

This invention generally relates to an actuating device for a bicycle hydraulic operating system. More specifically, the present invention relates to an actuating device for a bicycle hydraulic operating system in which two actuating devices can be used to operate a single hydraulic operated device.

Background Information

Recently, hydraulic brake systems are for used in bicycles. The hydraulic brake system for a bicycle typically has a brake lever (e.g., an actuating device) that is fluidly connected to a brake caliper (e.g., a hydraulic operated device) by a hydraulic brake hose. The brake caliper is hydraulically controlled by hydraulic fluid flowing through the hydraulic brake hose in response to an operation of the brake lever. In particular, the operation of the brake lever forces hydraulic fluid through the hydraulic brake hose to the brake caliper. The hydraulic fluid then moves one or more pistons to cause the brake pads to squeeze a brake rotor that is attached to a hub of a bicycle wheel.

SUMMARY

Generally, the present disclosure is directed to various features of an actuating device for a bicycle hydraulic operating system in which the actuating device and an additional actuating device can be selectively used operate a single hydraulic operated device.

In view of the state of the known technology and in accordance with a first aspect of the present disclosure, an actuating device is provided that is part of a bicycle hydraulic operating system that also includes an additional actuating device and a hydraulic operated device. The additional actuating device includes an additional operating member, an additional master cylinder having an additional fluid port and an additional master piston movably arranged in the additional master cylinder in response to an operation of the additional operating member. The hydraulic operated device includes a slave cylinder and a slave piston movably arranged in the slave cylinder. The slave cylinder has a slave fluid port fluidly connected to the additional fluid ports of the additional master cylinders such that the operation of the additional operating member moves the slave piston. The actuating device includes an operating member, a master cylinder, a master piston and a fluid port. The master piston is movably arranged in the master cylinder in response to an operation of the operating member. The fluid port is provided to the master cylinder. The fluid port is used for fluidly connecting the master cylinder to the slave fluid port such that the operation of the operating member moves the slave piston. The actuating device has no fluid reservoir. The master cylinder of the actuating device is used for being fluidly connected to the additional fluid port of the additional actuating device at a point upstream of the fluid port with respect to a flow of hydraulic fluid towards the hydraulic operated device.

In the actuating device according to a second aspect of the present disclosure, the actuating device according to the first aspect is configured such that the additional operating member includes an additional lever. The additional actuating device is configured to displace hydraulic fluid with a first amount as the additional lever is pivoted with a first stroke. The operating member includes a lever. The actuating device is configured to be used for displacing hydraulic fluid with a second amount differing from the first amount as the lever is pivoted with a second stroke being same as the first stroke.

In the actuating device according to a third aspect of the present disclosure, the actuating device according to the first or second aspect is configured such that the master cylinder of the actuating device further includes a connecting port. The connecting port is used for selectively and fluidly connecting the additional fluid port of the additional actuating device to the slave fluid port of the hydraulic operated device in accordance with a position of the master piston of the actuating device.

In the actuating device according to a fourth aspect of the present disclosure, the actuating device according to the third aspect is configured such that the connecting port comprises a first portion and a second portion. The first portion is used for selectively and fluidly connecting the additional fluid port to the slave fluid port in accordance with the position of the master piston. The second portion is in fluid communication with a space between an outer surface of the master piston and an inner surface of the master cylinder.

In the actuating device according to a fifth aspect of the present disclosure, the actuating device according to any one of the first to fourth aspects is configured such that the actuating device further includes a connecting port and a push rod. The push rod operatively connects the operating member to the master piston. The master piston has a fluid passage that fluidly connects the connecting port to the fluid port through the master piston and is selectively blocked by the push rod in response to the operation of the operating member.

In the actuating device according to a sixth aspect of the present disclosure, the actuating device according to any one of the first to fifth aspects is configured such that the additional actuating device includes a bracket and a securing member. The bracket has a proximal end portion, a distal end portion and a gripping portion that is arranged between the proximal end portion and the distal end portion. The securing member is provided on the proximal end portion of the bracket for securing the bracket to a handlebar, the additional operating member is pivotally attached to the distal end portion. The actuating device is configured such that the operating member extends in a lateral direction in a state where the actuating deceive is mounted to the handlebar.

In view of the state of the known technology and in accordance with a seventh aspect of the present disclosure, a bicycle hydraulic operating system is provided that basically comprises an actuating having no fluid reservoir, an additional actuating device and a hydraulic operated device. The actuating device includes an operating member, a master cylinder, a master piston and a fluid port. The master piston is movably arranged in the master cylinder in response to an operation of the operating member. The fluid port is provided to the master cylinder. The fluid port is used for fluidly connecting the master cylinder to the slave fluid port such that the operation of the operating member moves the slave piston. The additional actuating device includes an additional operating member, an additional master cylinder and an additional master piston. The additional master cylinder has an additional fluid port that is fluidly connected to the master cylinder of the actuating device at a point upstream of the fluid port with respect to a flow of hydraulic fluid towards the hydraulic operated device. The additional master piston is movably arranged in the additional master cylinder in response to an operation of the additional operating member. The hydraulic operated device includes a slave cylinder and a slave piston movably arranged in the slave cylinder. The slave cylinder has a slave fluid port fluidly connected to the additional fluid port of the additional master cylinder such that the operation of the additional operating member moves the slave piston.

Also, other objects, features, aspects and advantages of the disclosed actuating device will become apparent to those skilled in the art from the following detailed description, which, taken in conjunction with the annexed drawings, discloses several embodiments of the actuating device.

BRIEF DESCRIPTION OF THE DRAWINGS

Referring now to the attached drawings which form a part of this original disclosure.

DETAILED DESCRIPTION OF EMBODIMENTS

Figure 1:
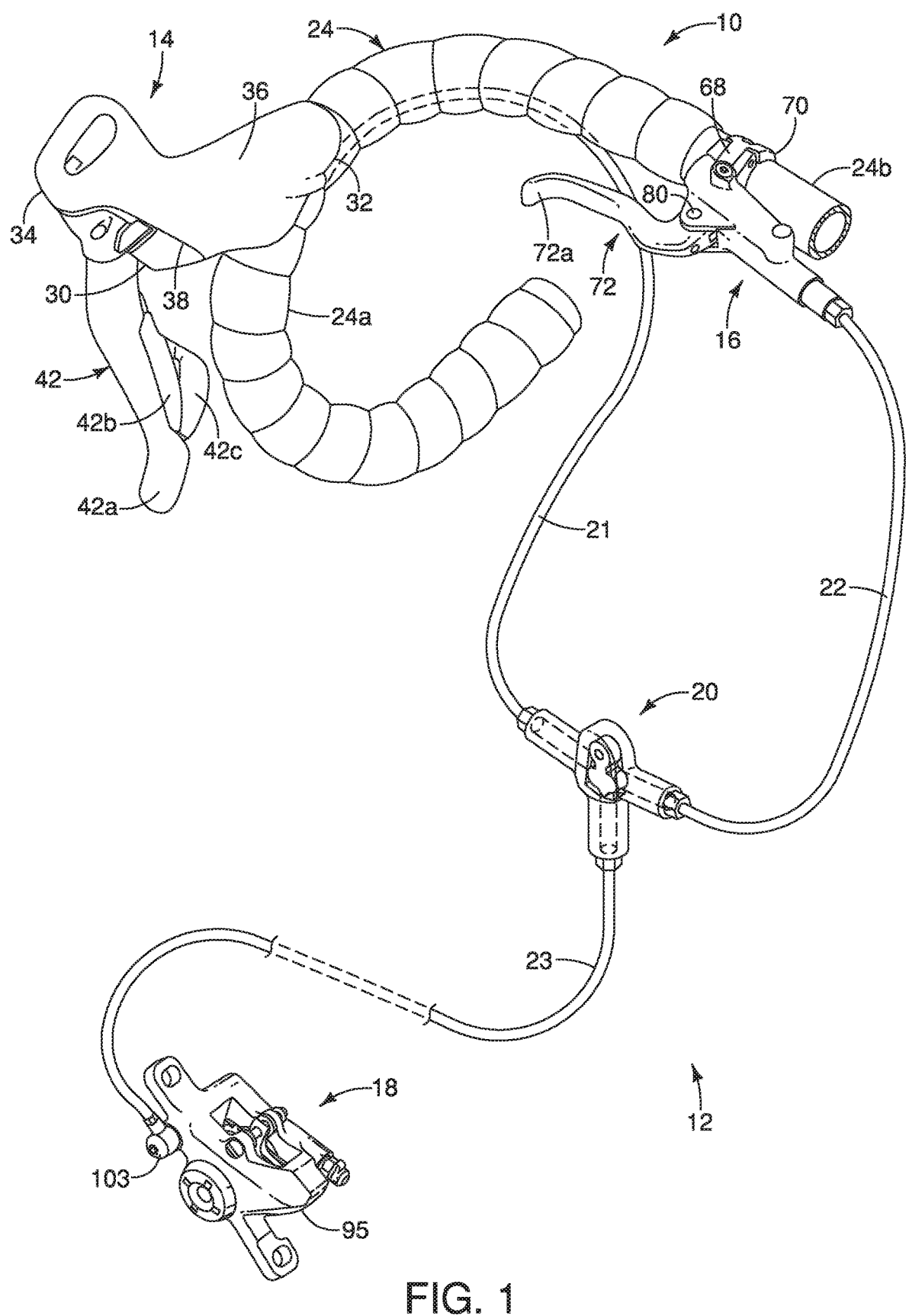
FIG. 1 is a schematic perspective view of a bicycle hydraulic operating system having an actuating device in accordance with a first illustrated embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Referring initially to FIGS. 1 to 4, a portion of a bicycle 10 is illustrated that is equipped with a bicycle hydraulic operating system 12 in accordance with a first embodiment. Here, in the first embodiment, the bicycle hydraulic operating system 12 basically comprises a first actuating device 14, a second actuating device 16 and a hydraulic operated device 18. Both of the first and second actuating devices 14 and 16 are in fluid communication with the hydraulic operated device 18. In this way, the rider can actuate the hydraulic operated device 18 using either one of the first and second actuating devices 14 and 16. Here, in the first embodiment, the bicycle hydraulic operating system 12 further comprises a switching device 20 that selectively couples one of the first and second actuating devices 14 and 16 to the hydraulic operated device 18. The first actuating device 14 is fluidly connected to the switching device 20 by a first hydraulic line or hose 21. The second actuating device 16 is fluidly connected to the switching device 20 by a second hydraulic line 22. The switching device 20 is fluidly connected to the hydraulic operated device 18 by a third hydraulic line 23.

Here, as seen in FIG. 1, the first and second actuating devices 14 and 16 are mounted to a drop handlebar 24. More specifically, the drop handlebar 24 has a pair of curved sections 24a (only one shown) and a straight section 24b that interconnects the curved sections 24a. The first actuating device 14 is mounted to one of the curved sections 24a. The second actuating device 16 is mounted to the straight section 24b. In this way, the rider can operate the first actuating device 14 from the curved section 24a, and operate the second actuating device 16 from the straight section 24b.

As illustrated in FIGS. 1 to 4, the first and second actuating devices 14 and 16 are a right hand side hydraulic component actuating device that are operated by the rider's right hand to actuate the hydraulic operated device 18. It will be apparent to those skilled in the bicycle field that the configuration of the first and second actuating devices 14 and 16 can be adapted to a left hand side hydraulic operating system that is operated by the rider's left hand.

The first actuating device 14 is specifically designed for use on the curved section 24a of the drop handlebar 24. As explained below, the first actuating device 14 includes both a braking function and a shifting function in a single unit. In other words, the first actuating device 14 is a bicycle brake/shift device, which is also known as a bicycle brifter. In other words, as used herein, a bicycle brifter is a device that includes both a braking function and a shifting function in a single unit that is mounted to the bicycle. Also as used herein, a drop handlebar brifter is a device that is specifically configured to be mounted to the curved section 24a of the drop handlebar 24, as illustrated in FIG. 1, and that includes both braking and shifting functions in a single unit. However, it will be apparent to those skilled in the bicycle field from this disclosure that the shifting function could be eliminated from the first actuating device 14 if needed and/or desired.

Figure 2:
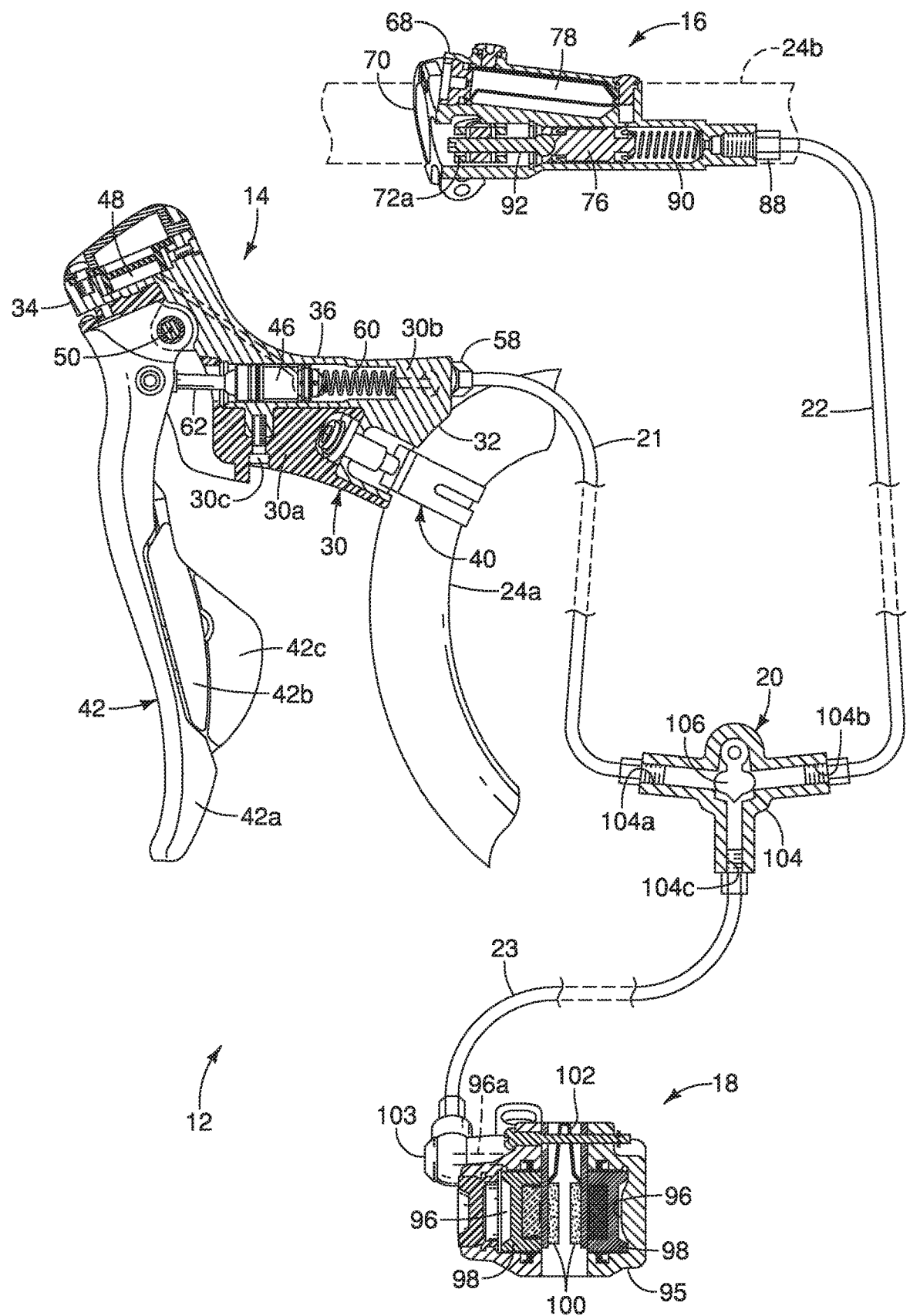
FIG. 2 is a schematic view of the bicycle hydraulic operating system illustrated in FIG. 1 with selected components shown in cross section and the actuating device and an additional actuating device in rest positions or non-operated positions and the switching device in a center or neutral position.
Figure 3:
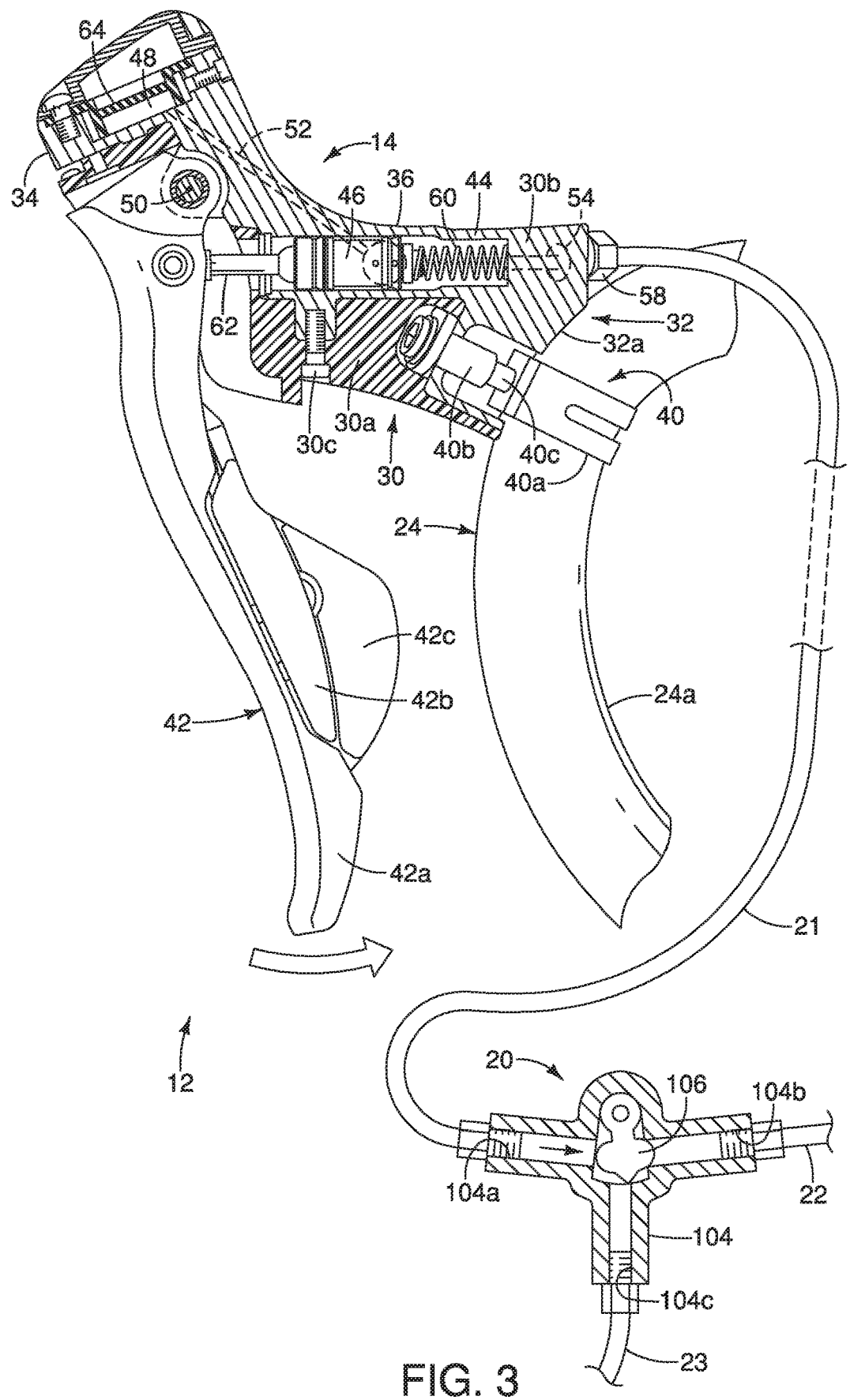
FIG. 3 is an enlarged schematic elevational view of the additional actuating device and the switching device of the bicycle hydraulic operating system illustrated in FIG. 2 with the additional lever of the additional actuating device moved to a partially operated position and the switching device moved to a first position.

As illustrated in FIGS. 1 to 3, the first actuating device 14 includes a drop handlebar bracket 30 (hereinafter referred as the bracket) having a proximal end portion 32, a distal end portion 34 and a gripping portion 36. The gripping portion 36 is arranged between the proximal end portion 32 and the distal end portion 34. Here, as illustrated in FIGS. 2 and 3, the bracket 30 includes a main body 30a and a hydraulic unit 30b. The main body 30a is typically made of a suitable material such as a hard plastic material, and forms a majority of the gripping portion 36. The hydraulic unit 30b is typically made of a metallic material, and is attached to the main body 30a. The hydraulic unit 30b is detachable from the main body 30a by a bolt 30c. The main body 30a and the hydraulic unit 30b are constructed as shown in U.S. Patent Application Publication No. 2013/0255239 A1 (assigned to Shimano, Inc.).

Although not shown, the gripping portion 36 can have removable panels as needed and/or desired. For example, the gripping portion 36 can include an outer panel for accessing an electronic circuit board installed within the gripping portion 36. The proximal end portion 32 has a curved surface 32a (FIG. 3), which mates with the curved section 24a of the drop handlebar 24 when in the installed position. The distal end portion 34 protrudes upwardly with respect to the gripping portion 36 to define a pommel portion of the bracket 30. The distal end portion 34 (i.e., the pommel portion) is located at a forward free end of the bracket 30.

As illustrated in FIG. 1, a grip hood or cover 38 is stretched over at least the gripping portion 36 and the distal end portion 34 to provide a cushion to the gripping portion 36 of the bracket 30 and the distal end portion 34 (i.e., the pommel portion) to provide an attractive appearance and a comfortable feeling for the rider's hand. Typically, the grip cover 38 is made of elastic material such as rubber.

As illustrated in FIG. 3, the first actuating device 14 further includes a securing member 40 that is attached to the proximal end portion 32 of the bracket 30. The securing member 40 releasably secures the bracket 30 to the curved section 24a of the drop handlebar 24. The securing member 40 basically includes a band part 40a, a first fastener part 40b, and a second fastener part 40c. The second fastener part 40c extends from the band part 40a. The first fastener part 40b is screwed onto the second fastener part 40c. The first fastener part 40b and the second fastener part 40c are located in a hole of the proximal end portion 32. In this way, a head of the first fastener part 40b applies a first force on the proximal end portion 32 and the second fastener part 40c applies a second force on the band part 40a when the first fastener part 40b is screwed onto the second fastener part 40c. Thus, by tightening the first fastener part 40b, the band part 40a is moved toward the proximal end portion 32 such that the curved section 24a of the drop handlebar 24 is squeezed between the band part 40a and the curved surface 32a of the proximal end portion 32. It will be apparent to those skilled in the bicycle field that the securing member 40 that is not limited to the illustrated mechanism, but rather other suitable attachment mechanisms can be used as needed and/or desired.

The first actuating device 14 further includes a first operating member 42, a first master cylinder 44 and a first master piston 46. In this first embodiment, the first actuating device 14 has a fluid reservoir 48. Thus, in this first embodiment, the first actuating device 14 is constructed as an open type hydraulic device. Basically, an operation of the first operating member 42 moves the first master piston 46 within the first master cylinder 44 to cause displacement of hydraulic fluid from the first master cylinder 44 to actuate the hydraulic operated device 18 via the switching device 20.

The first operating member 42 is pivotally attached to the distal end portion 34 of the bracket 30. In particular, the first operating member 42 includes a first lever 42a that is configured to be pivotally moved with respect to the first master cylinder 44. A pivot pin 50 pivotally connects the first lever 42a to the distal end portion 34 of the bracket 30. In the illustrated embodiment, the first operating member 42 further includes a pair of gearshift operating parts 42b and 42c for performing gear shifting operations of a gear changing device (not shown). Preferably, the gearshift operating parts 42b and 42c are electrically connected to a gearshift control unit (not shown) that is mounted within a recess in the bracket 30.

The gearshift operating parts 42b and 42c are constructed as shown in U.S. Patent Application Publication No. 2009/0031841 A1 (assigned to Shimano, Inc.). It will be apparent to those skilled in the bicycle field that the gearshift operating parts 42b and 42c are not limited to the illustrated structure and arrangement, but rather other suitable structures and arrangements can be used as needed and/or desired. The gearshift control unit (not shown) is a microcomputer that is located in the bracket 30. However, the gearshift control unit can be remotely located if needed and/or desired. Since various electrical shifting systems are known in the bicycle field, the gearshift operating parts 42b and 42c and the gearshift control unit will not be discussed herein for the sake of brevity. Alternatively, the first actuating device 14 can be provided with a mechanical cable type shifting unit in which a shift cable is selectively pulled or released by the operation of the mechanical cable type shifting unit. For example, the mechanical cable type shifting unit could be mounted in the gripping portion 36 and one or more operating members can be provided on the first operating member 42 for operating the mechanical cable type shifting unit.

Here, in the first embodiment, the first master cylinder 44 is formed by hydraulic unit 30b of the bracket 30, and located within the gripping portion 36 of the bracket 30. In other words, the gripping portion 36 of the bracket 30 is partially formed by the hydraulic unit 30b that defines a cylinder bore (interior hydraulic chamber) of the first master cylinder 44. Alternatively, if needed and/or desired, it will be apparent to those skilled in the bicycle field that the first master cylinder 44 can be integrally formed as a one-piece unit with the main body 30a of the bracket 30. In other words, the bracket 30 can be constructed as a one-piece member having the first master cylinder 44.

The bracket 30 further includes a connecting port 52 that fluidly connects the fluid reservoir 48 to the first master cylinder 44. In this way, the fluid reservoir 48 supplies the hydraulic fluid (e.g., mineral oil) to the first master cylinder 44. The first master cylinder 44 has a first fluid port 54. The first fluid port 54 is fluidly connected to the hydraulic chamber of the first master cylinder 44. The first hydraulic line 21 is fluidly connected to the first fluid port 54. In particular, for example, the first hydraulic line 21 is releasably connected to the first fluid port 54 of the bracket 30 by a conventional connector 58.

The first master piston 46 is movably arranged in the cylinder bore of the first master cylinder 44 in a reciprocal manner in response to an operation of the first lever 42a of the first operating member 42. The first master piston 46 and an internal surface of the first master cylinder 44 define a hydraulic chamber of the first actuating device 14. A biasing element 60 is disposed in the first master cylinder 44 for biasing the first master piston 46 to a rest position or non-operated position. In the illustrated embodiment, the biasing element 60 is a coil compression spring (return spring) that also biases the first lever 42a of the first operating member 42 to its rest position (i.e., no external force applied to the first actuating device 14) as seen in FIG. 2. As illustrated in FIGS. 2 and 3, the first lever 42a of the first operating member 42 is operatively connected to the first master piston 46 by a push rod 62. Preferably, the push rod 62 is connected to the first lever 42a of the first operating member 42 with a reach adjustment connection (not illustrated) that adjusts the reach of the first lever 42a. The reach adjustment connection between the push rod 62 and the first lever 42a can be, for example, substantially similar in construction to the reach adjustment connection that is disclosed in U.S. Patent Application Publication No. 2011/0147149 A1 (assigned to Shimano, Inc.). Also preferably, the bracket 30 includes a piston end position adjustment connection that controls relative positions of the first operating member 42 and the first master piston 46 in their rest positions with respect to the first master cylinder 44.

FIG. 3 shows the first lever 42a of the first operating member 42 pivoted about the pivot pin 50 from the rest position to a partially operated position. Basically, the operation of the first lever 42a of the first operating member 42 moves the push rod 62 which in turn pushes the first master piston 46 within the cylinder bore of the first master cylinder 44 against the biasing force of the biasing element 60. As the result of this movement of the first master piston 46, the biasing element 60 is compressed and the hydraulic fluid in the hydraulic chamber is forced out of the hydraulic chamber via the first fluid port 54 into the first hydraulic line 21 to actuate the hydraulic operated device 18.

As best seen in FIG. 3, the fluid reservoir 48 is disposed within the distal end portion 34 (i.e., the pommel portion) of the bracket 30 at a location that is above the first master cylinder 44 while the first actuating device 14 is in an installed position on the drop handlebar 24 as seen in FIG. 1. Of course, it will be apparent to those skilled in the bicycle field from this disclosure that the fluid reservoir 48 is not limited to the illustrated location, but rather other suitable locations can also be used. In any case, the location of the fluid reservoir 48 is located above the first master cylinder 44 while the first actuating device 14 is in an installed position on the drop handlebar 24 as seen in FIG. 1. In the first embodiment, the fluid reservoir 48 includes a flexible diaphragm 64. The configuration, construction and function of the fluid reservoir 48 are well known in the bicycle field, and thus, will not be discussed in further detail herein.

Figure 4:
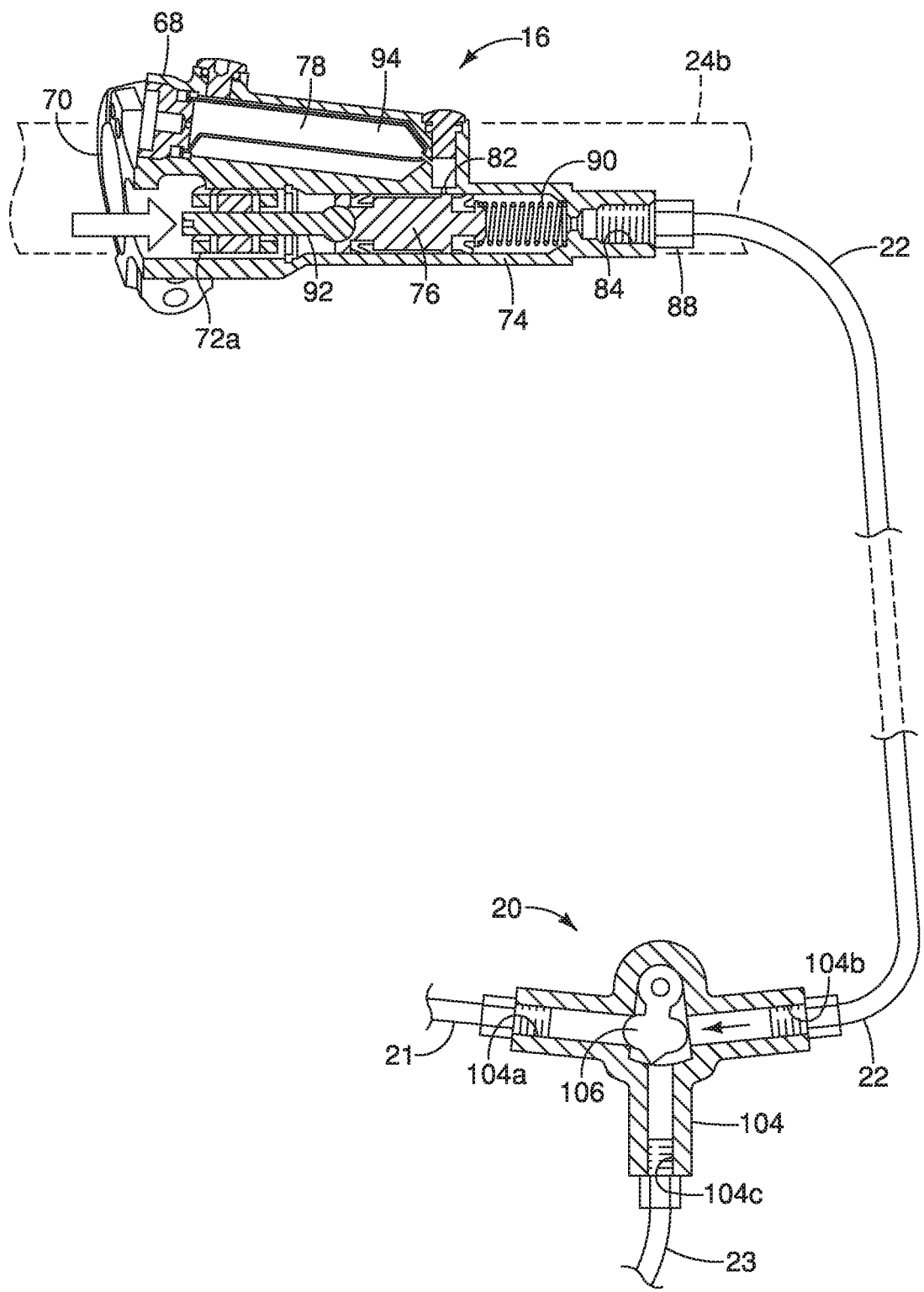
FIG. 4 is an enlarged schematic elevational view of the second actuating device and the switching device of the bicycle hydraulic operating system illustrated in FIG. 2 with the lever of the actuating device moved to a partially operated position and the switching device moved to in a second position.

Referring to FIGS. 1, 2 and 4, the second actuating device 16 will now be discussed. The second actuating device 16 is specifically designed for use on the straight section 24b of the drop handlebar 24. Unlike the first actuating device 14, the second actuating device 16 only includes a braking function. However, it will be apparent to those skilled in the bicycle field from this disclosure that a shifting function could be added to the second actuating device 16 if needed and/or desired. The second actuating device 16 includes a base member 68 having a handlebar clamp 70. The handlebar clamp 70 is a conventional tube clamp that constitutes an example of a handlebar mounting member. Here, the handlebar clamp 70 is a hinged clamp. However, it will be apparent to those skilled in the bicycle field from this disclosure that the handlebar clamp 70 could be non-hinged clamp.

As seen FIGS. 1 and 4, the second actuating device 16 includes a second operating member 72, a second master cylinder 74 and a second master piston 76. In this first embodiment, the second actuating device 16 has a fluid reservoir 78. Thus, in this first embodiment, the second actuating device 16 is constructed as an open type hydraulic device. The construction of the second actuating device 16 is disclosed in more detail in U.S. Patent Application Publication No. 2011/0240425 A1 (assigned to Shimano, Inc.). Basically, an operation of the second operating member 72 moves the second master piston 76 within the second master cylinder 74 to cause displacement of hydraulic fluid from the second master cylinder 74 to actuate the hydraulic operated device 18 via the switching device 20.

The second operating member 72 includes a second lever 72a that is configured to be pivotally moved with respect to the second master cylinder 74. In this first embodiment, the second lever 72a of the second operating member 72 extends a lateral direction in a state where the second actuating deceive 16 is mounted to the straight section 24b of the drop handlebar 24. As seen in FIG. 1, a pivot pin 80 pivotally connects the second lever 72a to the base member 68. While the second operating member 72 is illustrated as simply the second lever 72a, it will be apparent to those skilled in the bicycle field from this disclosure that the second operating member 72 can include other parts and/or features such as various adjustment mechanisms.

Here, in the first embodiment, the second master cylinder 74 is formed by the base member 68. In other words, the base member 68 forms a hydraulic cylinder housing that defines a cylinder bore (interior hydraulic chamber) of the second master cylinder 74. Thus, the base member 68 and the second master cylinder 74 are formed as an integral one-piece unit such that the base member 68 constitutes a cylinder housing of the second master cylinder 74. It will be apparent to those skilled in the bicycle field that the second master cylinder 74 can be part of a hydraulic unit that is detachable from the base member 68 if needed and/or desired.

The base member 68 further includes a connecting port 82 that fluidly connects the fluid reservoir 78 to the second master cylinder 74. In this way, the fluid reservoir 78 supplies the hydraulic fluid to the second master cylinder 74. The second master cylinder 74 has a second fluid port 84. The second fluid port 84 is fluidly connected to the hydraulic chamber of the second master cylinder 74. The second hydraulic line 22 is fluidly connected to the second fluid port 84. In particular, for example, the second hydraulic line 22 is releasably connected to second fluid port 84 by a conventional connector 88.

The second master piston 76 is movably arranged in the cylinder bore of the second master cylinder 74 in a reciprocal manner in response to the operation of the second lever 72a of the second operating member 72. The second master piston 76 and an internal surface of the second master cylinder 74 define a hydraulic chamber of the second actuating device 16. A biasing element 90 is disposed in the second master cylinder 74 for biasing the second master piston 76 to a rest position or non-operated position. In the illustrated embodiment, the biasing element 90 is a coil compression spring (return spring) that also biases the second lever 72a of the second operating member 72 to its rest position (i.e., no external force applied to the second actuating device 16) as seen in FIGS. 1 and 2. As illustrated in FIGS. 2 and 3, the second lever 72a of the second operating member 72 is operatively connected to the second master piston 76 by a push rod 92. FIG. 4 shows the second lever 72a of the second operating member 72 pivoted about the pivot pin 80 from the rest position to a partially operated position. Basically, the operation of the second lever 72a of the second operating member 72 moves the push rod 92 which in turn pushes the second master piston 76 within the cylinder bore of the second master cylinder 74 against the biasing force of the biasing element 90. As the result of this movement of the second master piston 76, the biasing element 90 is compressed and the hydraulic fluid in the hydraulic chamber is forced out of the hydraulic chamber via the second fluid port 84 into the second hydraulic line 22 to actuate the hydraulic operated device 18.

As best seen in FIG. 4, the fluid reservoir 78 is formed by the base member 68 at a location that is above the second master cylinder 74 while the second actuating device 16 is in an installed position on the straight section 24b of the drop handlebar 24 as seen in FIG. 1. Thus, the base member 68 and the fluid reservoir 78 are formed as an integral one-piece unit such that the base member 68 constitutes a reservoir housing of the fluid reservoir 78. Of course, it will be apparent to those skilled in the bicycle field from this disclosure that the fluid reservoir 78 is not limited to the illustrated location, but rather other suitable locations can also be used. In any case, the location of the fluid reservoir 78 is located above the second master cylinder 74 while the second actuating device 16 is in an installed position on the drop handlebar 24 as seen in FIG. 1. In the first embodiment, the fluid reservoir 78 includes a flexible diaphragm 94. The configuration, construction and function of the fluid reservoir 78 are disclosed in more detail in U.S. Patent Application Publication No. 2011/0240425 A1 (assigned to Shimano, Inc.).

Here, in the first embodiment, the hydraulic operated device 18 comprises a hydraulic braking device. More specifically, the hydraulic operating device 18 comprises a disc brake caliper that engages a brake rotor (not shown) in a conventional manner for slowing or stopping the rotation of a bicycle wheel (not shown) that is equipped with the brake rotor. As seen in FIGS. 1 and 2, the hydraulic operated device 18 has a caliper housing 95 that is mounted to a portion (not shown) of the bicycle 10. As seen in FIG. 2, the hydraulic operated device 18 includes a pair of slave cylinders 96 and a pair of slave pistons 98. The caliper housing 95 defines the slave cylinders 96. The hydraulic operated device 18 further includes a pair of brake pads 100 and a biasing member 102. The slave pistons 98 are movably arranged in the slave cylinders 96, respectively. While the hydraulic operated device 18 includes a pair of movable pistons, it will be apparent to those skilled in the bicycle field from this disclosure that the hydraulic operated device 18 can have one non-movable piston and only one movable piston if needed and/or desired.

The slave pistons 98 are movably mounted in the caliper housing 95 in a conventional manner. The slave pistons 98 are biased away from each other by the biasing member 102, which presses the brake pads 100 outwardly against the slave pistons 98. The slave pistons 98 are moved together due to the pressure of the hydraulic fluid acting on the slave pistons 98 as a result of a user squeezing one of the first and second levers 42a and 72a of the first and second actuating devices 14 and 16 that is fluidly connected to the caliper housing 95. The slave cylinders 96 includes a slave fluid port 96a that is fluidly connected to the first and second fluid ports 54 and 84 of the first and second master cylinders 44 and 74. In particular, the third hydraulic line 23 is fluidly connected to the slave fluid port 96a by a banjo bolt 103 that screws into the slave fluid port 96a. An internal fluid communication passageway fluid connects the slave fluid port 96a to each of the slave pistons 98. As a result, the operation of the first operating member 42 moves the slave pistons 98, and the operation of the second operating member 72 moves the slave pistons 98.

Now the switching device 20 will be discussed in more detail. Basically, the switching device 20 selectively couples one of the first and second master cylinders 44 and 74 to the hydraulic operated device 18. The switching device 20 includes a housing 104 having a first opening 104a, a second opening 104b and a third opening 104c. The first opening 104a is fluidly connected to the first fluid port 54 of the first master cylinder 44. The second opening 104b is fluidly connected to the second fluid port 84 the second master cylinder 74. The third opening 104c is fluidly connected to the slave fluid port 96a of the slave cylinders 96. The switching device 20 further includes a movable member 106 that is movably mounted in the housing 104 to block the second opening 104b in response to the operation of the first operating member 42 and to block the first opening 104a in response to the operation of the second operating member 72. In particular, the movable member 106 is pivotally coupled to the housing 104, and pivots in response to the pressure from the hydraulic fluid from the operation of the first and second operating members 42 and 72. Accordingly, when the first lever 42a is operated, the movable member 106 blocks the second opening 104b so that the hydraulic fluid flows through the third opening 104c into the third hydraulic line 23, and does not flow into the second hydraulic line 22. Likewise, when the second lever 72a is operated, the movable member 106 blocks the first opening 104a so that the hydraulic fluid flows through the third opening 104c into the third hydraulic line 23, and does not flow into the first hydraulic line 21.

In the bicycle hydraulic operating system 12, the first and second actuating devices 14 and 16 have the fluid reservoirs 48 and 78 respectively such that the first and second actuating devices 14 and 16 are both open type hydraulic devices. However, the bicycle hydraulic operating system 12 can be constructed such that only at least one of the first and second actuating devices has a fluid reservoir. In other words, the bicycle hydraulic operating system 12 can be constructed such that one of the first and second actuating devices is an open type hydraulic device that has a fluid reservoir while the other of the first and second actuating devices is a closed type hydraulic device that has no reservoir.

Basically, in summary, the operation of the first lever 42a or the second lever 72a causes displacement of the hydraulic fluid from the first master cylinder 44 or the second master cylinder 74 to the switching device 20. The movable member 106 blocks one of the first and second openings 104a and 104b, depending on which one of the first and second levers 42a and 72a is operated so that the hydraulic fluid flows through the third opening 104c into the third hydraulic line 23. The third hydraulic line 23 is connected to the slave fluid port 96a such that the hydraulic fluid being forced through the third hydraulic line 23 moves the slave pistons 98 in the slave cylinders 96. In accordance with movement of the slave pistons, the brake pads 100 come into contact with the brake rotor for applying frictional resistance and causing the bicycle to slow down or stop. Of course, the bicycle hydraulic operating system 12 is not limited to being used with a hydraulic brake system.

With the bicycle hydraulic operating system 12, it will be apparent to those skilled in the bicycle field that the first and second actuating devices 14 and 16 can be configured with either identical actuation ratios or different actuation ratios. As used herein, the term actuation ratio refers to a ratio of an output effect (i.e., a movement amount of the brake pads) to an input change (i.e., a stroke or movement amount of the operating member). Here, the output effect for each of the first and second actuating devices 14 and 16 is the amount of the hydraulic fluid that is outputted for a given amount of movement of the operating member. Preferably, the first actuating device 14 has a first actuation ratio, and the second actuating device 16 has a second actuation ratio that is larger than the first actuation ratio such that more the hydraulic fluid is displaced by the operation of the second operating member 72 than by the operation of the first operating member 42 for an identical stroke. In other words, the first actuating device 14 is configured to displace the hydraulic fluid with a first amount as the first lever 42a is pivoted with a first stroke. The second actuating device 16 is configured to displace the hydraulic fluid with a second amount differing from the first amount as the second lever 72a is pivoted with a second stroke being same as the first stroke.

Figure 5:
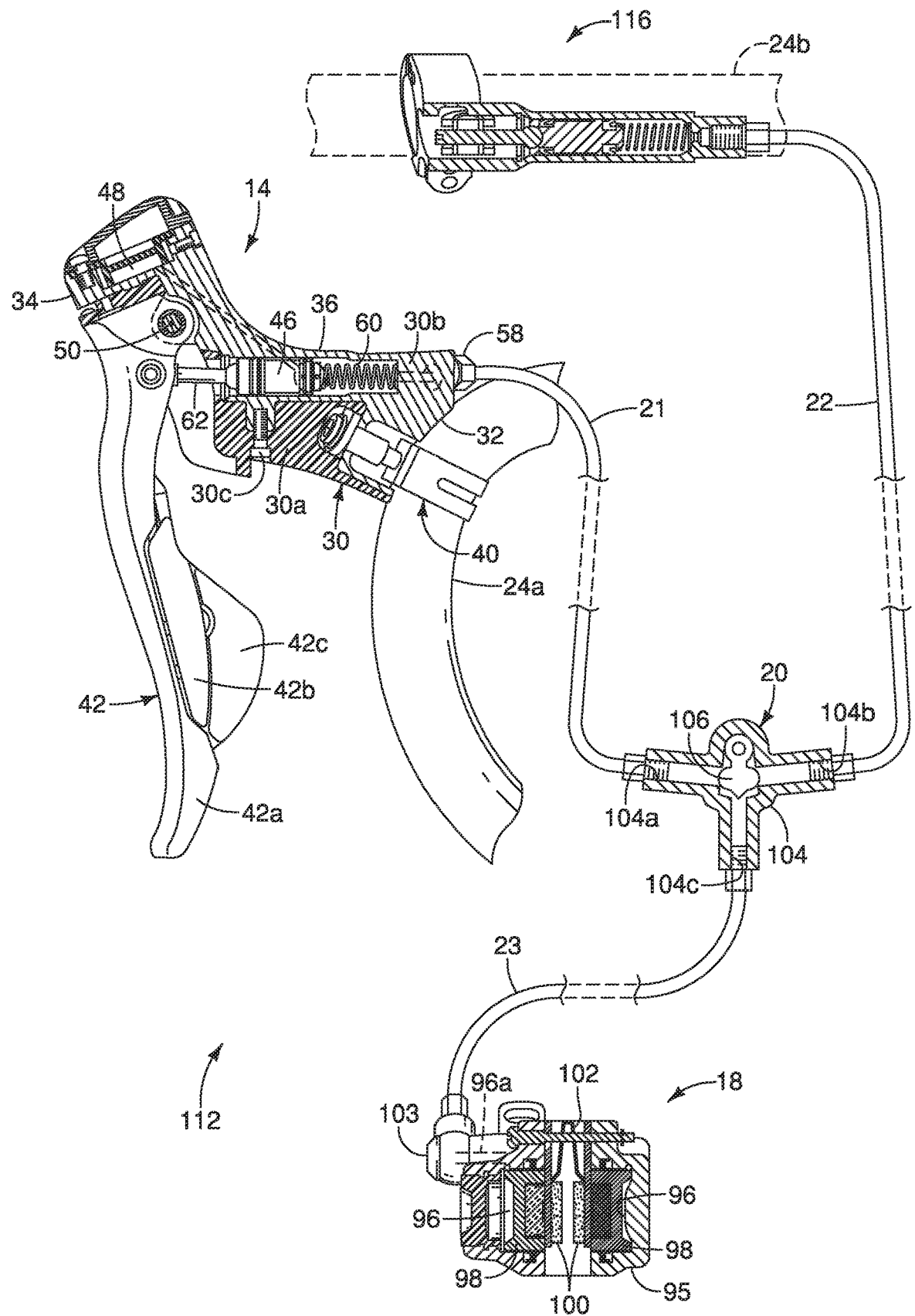
FIG. 5 is a schematic view of a bicycle hydraulic operating system having an actuating device in accordance with a second illustrated embodiment showing selected components in cross section and the actuating devices in rest positions or non-operated positions and the switching device in a center or neutral position.

Referring now to FIG. 5, a bicycle hydraulic operating system 112 in accordance with a second embodiment will now be discussed. In view of the similarity between the first and second embodiments, the bicycle hydraulic operating system 112 will only be briefly discussed for the sake of brevity. Moreover, the parts of the second embodiment, which are identical to the corresponding parts of the first embodiment, will be given the same reference numbers as in the first embodiment.

The bicycle hydraulic operating system 112 basically comprises the first actuating device 14 of the first embodiment, a second actuating device 116 and the hydraulic operated device 18 of the first embodiment. Here, in the second embodiment, the bicycle hydraulic operating system 112 further comprises the switching device 20 of the first embodiment. Similar to the first embodiment, the switching device 20 selectively couples one of the first and second actuating devices 14 and 116 to the hydraulic operated device 18. In this way, the rider can actuate the hydraulic operated device 18 using either one of the first and second actuating devices 14 and 116. Similar to the first embodiment, the first and second actuating devices 14 and 116 are fluidly connected to the switching device 20 by the first and second hydraulic lines 21 and 22, while the switching device 20 is fluidly connected to the hydraulic operated device 18 by the third hydraulic line 23.

The only difference between the first and second embodiments is that the second embodiment uses the second actuating device 116 instead of the second actuating device 16. The second actuating device 116 is identical to the second actuating device 16 of the first embodiment, except that the second actuating device 116 does not have a fluid reservoir. In other words, in the second embodiment, the first actuating device 14 is an open type hydraulic device, while the second actuating device 116 is a closed type hydraulic device that has no fluid reservoir. Alternatively, the first actuating device 14 can be constructed without a fluid reservoir and used with the second actuating device 16. In other words, one of the first and second actuating devices is an open type hydraulic device that has a fluid reservoir while the other of the first and second actuating devices is a closed type hydraulic device that has no reservoir.

Referring now to FIGS. 6 to 9, a bicycle hydraulic operating system 212 in accordance with a third embodiment will now be discussed. In view of the similarity between the bicycle hydraulic operating system 212 and the prior embodiments, the bicycle hydraulic operating system 212 will only be briefly discussed for the sake of brevity. Moreover, the parts of the third embodiment, which are identical to the corresponding parts of the first embodiment, will be given the same reference numbers as in the first embodiment.

The bicycle hydraulic operating system 212 basically comprises the first actuating device 14 of the first embodiment, a second actuating device 216 and the hydraulic operated device 18 of the first embodiment. In the third embodiment, the second actuating device 216 has no fluid reservoir similar to the second actuating device 116 of the second embodiment. Thus, the second actuating device 216 is constructed as a closed type hydraulic device. The first hydraulic line 21 is fluidly connected to the second actuating device 216 such that the fluid reservoir 48 of the first actuating device 14 also acts as the fluid reservoir for the second actuating device 216. The third hydraulic line 23 fluidly connects the second actuating device 216 to the hydraulic operated device 18, and thus, also fluidly connects the first actuating device 14 to the hydraulic operated device 18. Thus, similar to the prior embodiments, the rider can actuate the hydraulic operated device 18 using either one of the first and second actuating devices 14 and 216.

Figure 6:
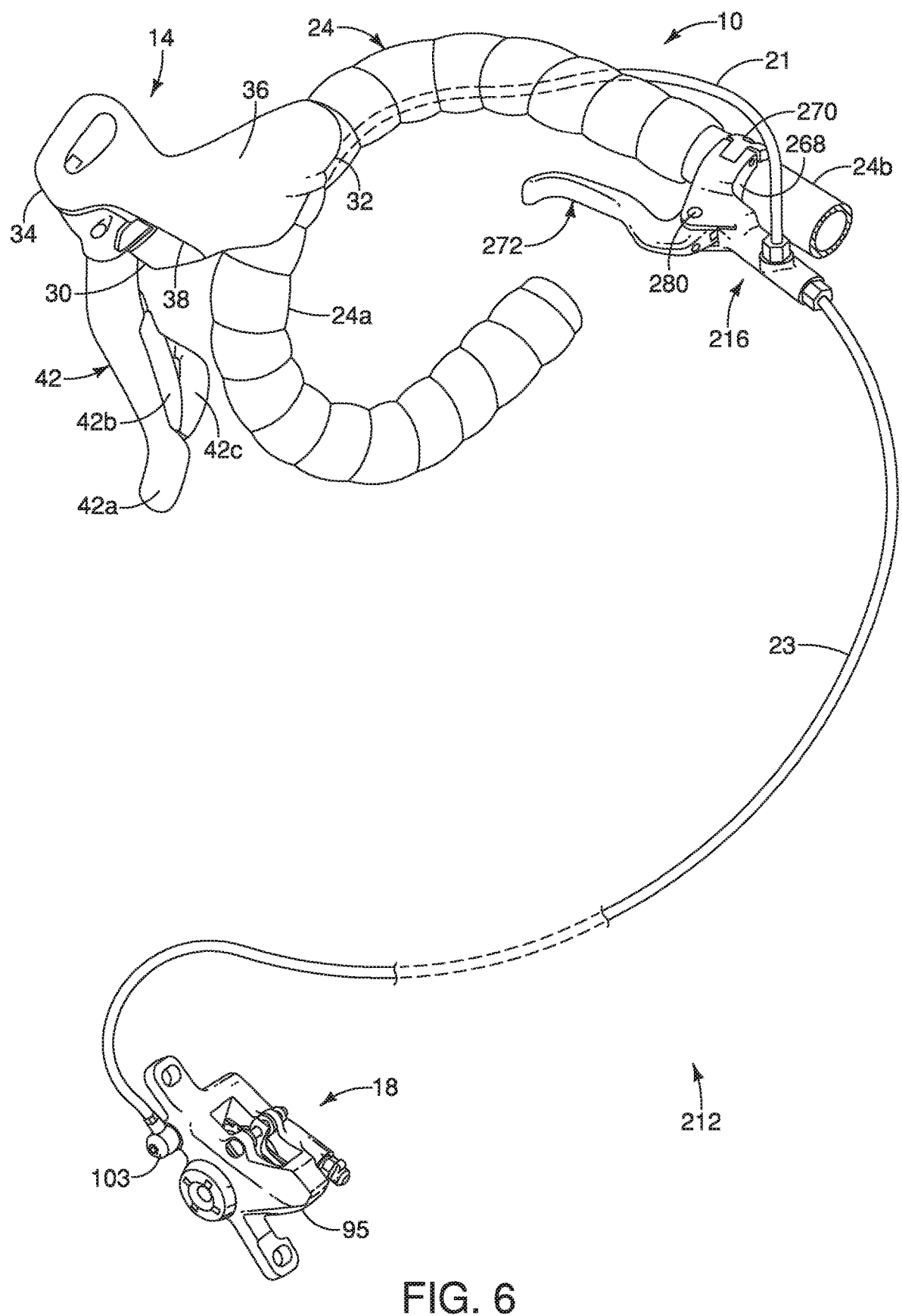
FIG. 6 is a schematic perspective view of a bicycle hydraulic operating having an actuating device system in accordance with a third illustrated embodiment.
Figure 7:
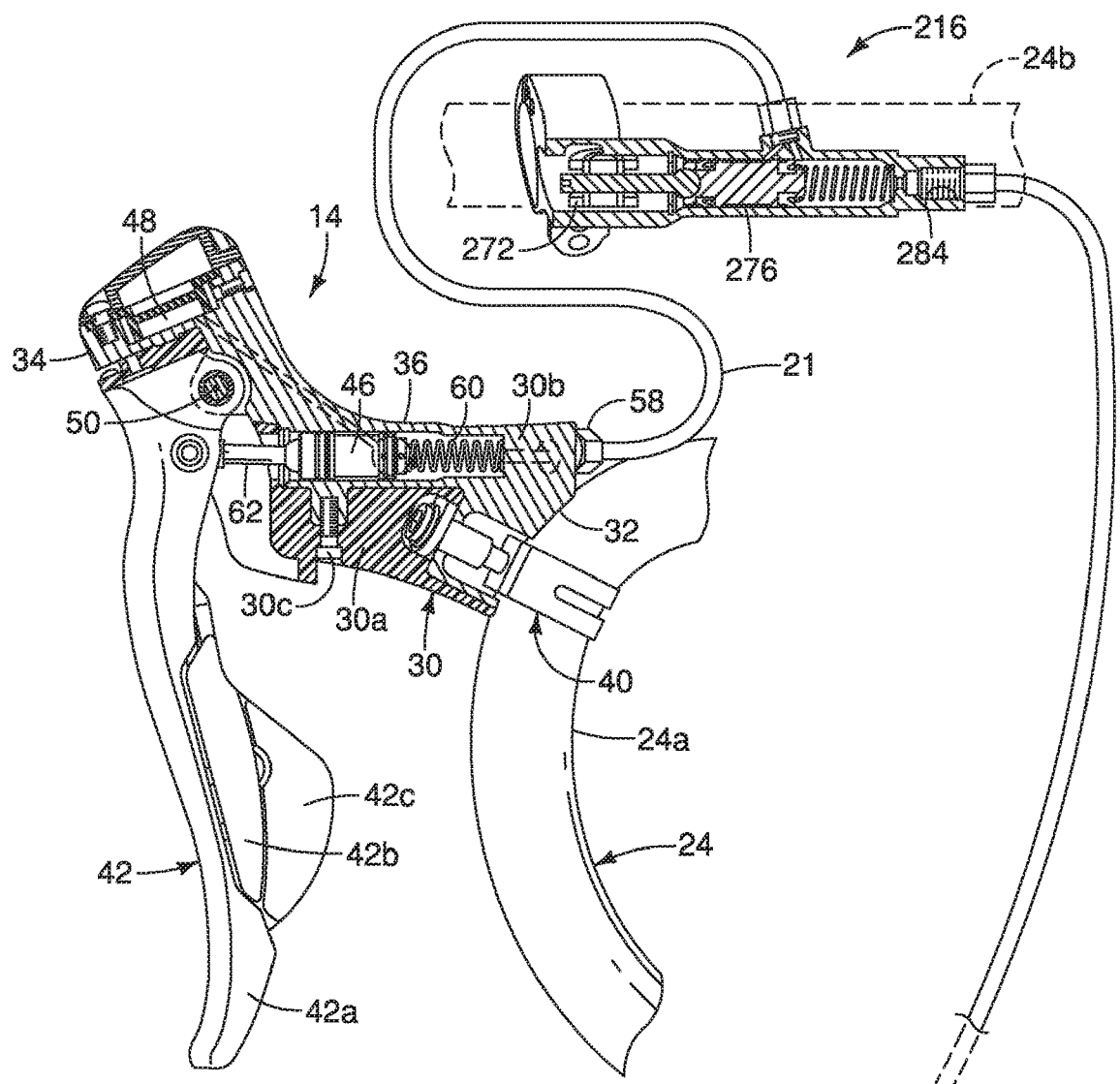
FIG. 7 is a schematic view of the bicycle hydraulic operating system illustrated in FIG. 6 with selected components shown in cross section and the actuating devices in rest positions.

As seen in FIGS. 6 and 7, the second actuating device 216 includes a base member 268 having an integrated handlebar clamp 270. The second actuating device 216 further includes a second operating member 272, a second master cylinder 274 and a second master piston 276. A pivot pin 280 pivotally connects the second operating member 272 to the base member 268.

In the bicycle hydraulic operating system 212, the second actuating device 216 can be simply referred to as an "actuating device" and the first actuating device 14 can be simply referred to as an "additional actuating device". Thus, the first (additional) actuating device 14 includes the first operating member 42 as an additional operating member, the first master cylinder 44 as an additional master cylinder, and the first master piston 46 as an additional master piston. The first (additional) master cylinder 44 has the first fluid port 54 as an additional fluid port that is fluidly connected to the second master cylinder 274 by the first hydraulic line 21.

Figure 8:
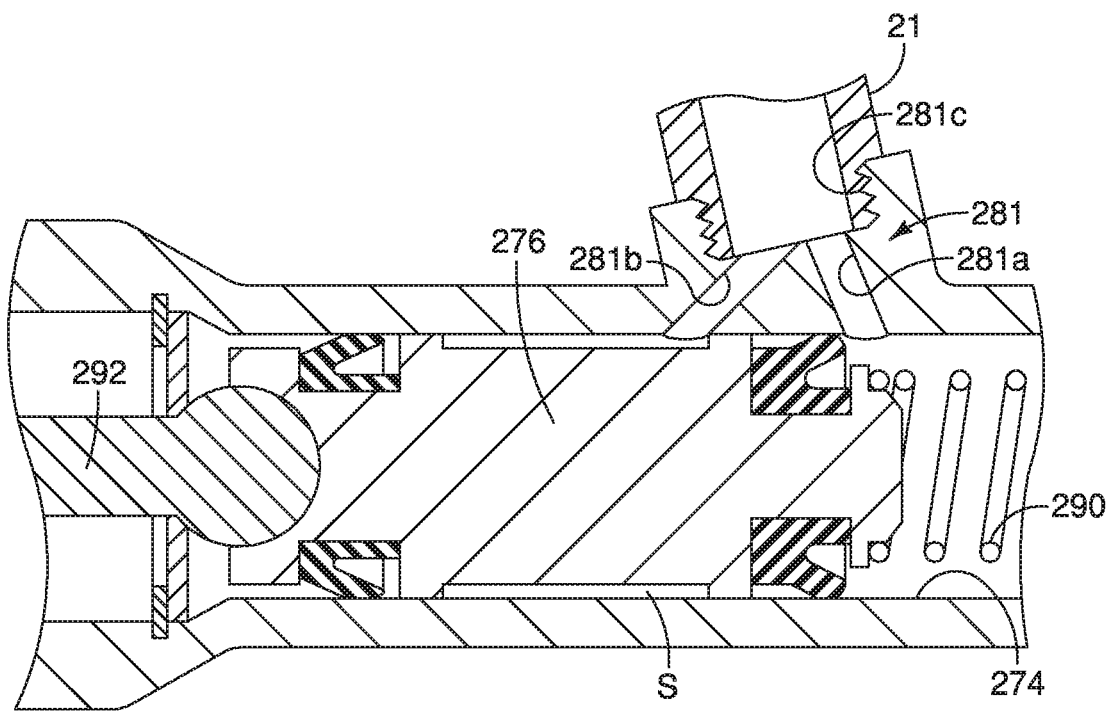
FIG. 8 is a partial cross-sectional view of the second actuating device of the bicycle hydraulic operating system illustrated in FIGS. 6 and 7 with the piston of the actuating device in a rest position or a non-operated position.
Figure 9:
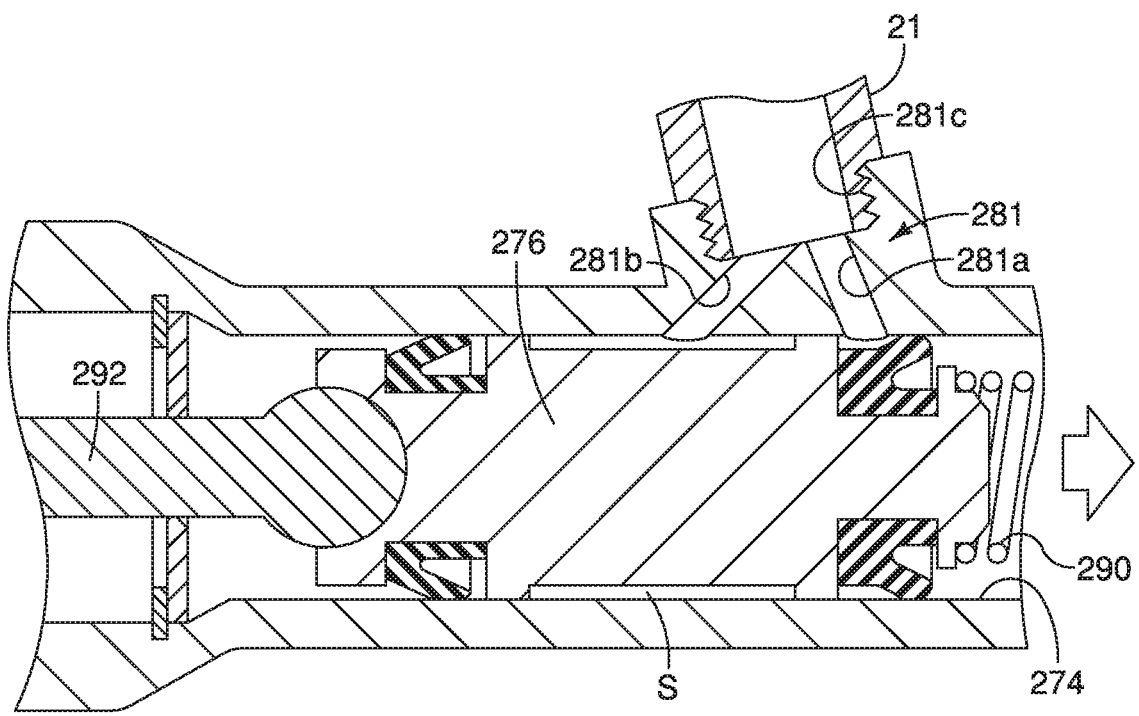
FIG. 9 is a partial cross-sectional view, similar to FIG. 8, of the second actuating device of the bicycle hydraulic operating system illustrated in FIGS. 6 and 7, but with the piston of the actuating device in an operated position.

Specifically, as seen in FIGS. 8 and 9, the second actuating device 216 further includes a connecting port 281. The connecting port 281 selectively and fluidly connects the first (additional) fluid port 54 of the first (additional) actuating device 14 to the slave fluid port 96a of the hydraulic operated device 18 in accordance with position of the second master piston 276 of the second actuating device 216. More specifically, the connecting port 281 comprises a first portion 281a, a second portion 281b and a third portion 281c. The third portion 281c is configured to attach the first hydraulic line 21. The first and second portions 281a and 281b extend from the third portion 281c to the hydraulic chamber of the second master cylinder 274 for supplying hydraulic fluid from the first master cylinder 44 of the first actuating device 14 to the hydraulic chamber of the second master cylinder 274. In other words, the first and second portions 281a and 281b receive hydraulic fluid from the first (additional) master cylinder 44 of the first (additional) actuating device 14. In particular, the first portion 281a selectively and fluidly connects the first fluid port 54 to the slave fluid port 96a in accordance with position of the second master piston 276. The second portion 281b is in fluid communication with a space S between an outer surface of the second master piston 276 and an inner surface of the second master cylinder 274. The second master cylinder 274 also has a second fluid port 284. The third hydraulic line 23 is fluidly connected to the second fluid port 284. The second actuating device 216 is identical to the second actuating device 16 of the first embodiment, except that the second actuating device 216 does not have a fluid reservoir and the first (additional) master cylinder 44 of the first (additional) actuating device 14 is fluidly connected to the second master cylinder 274 of the second actuating device 216. Thus, in this third embodiment, the second actuating device 216 is effectively an open type hydraulic device in that the fluid reservoir 48 supplies hydraulic fluid to the hydraulic chamber of the second master cylinder 274. In particular, the first (additional) fluid port 54 of the (additional) first actuating device 14 is fluidly connected to the second master cylinder 274 of the second actuating device 216 at a point upstream of the second fluid port 284 with respect to a flow of hydraulic fluid towards the hydraulic operated device 18. When the actuating devices 14 and 216 are mounted on the handlebar 24, the fluid reservoir 48 is located above the second master cylinder 274.

As seen in FIG. 8, the second master piston 276 is in a rest position or a non-operated position in which the first portion 281a of the connecting port 281 is open (i.e., in fluid communication with the hydraulic chamber of the second master cylinder 274) while the second operating member 272 is in a rest position or a non-operated position. As seen in FIG. 9, the second master piston 276 is in an operated position in which the first portion 281a of the connecting port 281 is closed (i.e., not in fluid communication with the hydraulic chamber of the second master cylinder 274) while the second operating member 272 is in the operated position. Thus, the operation of the second operating member 272 moves the second master piston 276 to block fluid communication between the first (additional) master cylinder 44 of the first (additional) actuating device 14 and the second master cylinder 274 of the second actuating device 216. However, when the second operating member 272 is in the rest position, the hydraulic fluid from the first (additional) master cylinder 44 can be forced through the second master cylinder 274 to actuate the hydraulic operated device 18. Also as a result of the second portion 281b of the connecting port 281 being in fluid communication with a space S, the hydraulic fluid from the first (additional) actuating device 14 lubricants the outer surface of the second master piston 276 and the inner surface of the second master cylinder 274.

In the second actuating device 216, a biasing element 290 is disposed in the second master cylinder 274 for biasing the second master piston 276 to the rest position. In the illustrated embodiment, the biasing element 290 is a coil compression spring (return spring) that also biases the second operating member 272 to its rest position (i.e., no external force applied to the second actuating device 216) as seen in FIGS. 7 and 8.

As illustrated in FIGS. 7 to 9, the second operating member 272 is operatively connected to the second master piston 276 by a push rod 292. Basically, an operation of the second operating member 272 moves the push rod 292 which in turn pushes the second master piston 276 within the cylinder bore of the second master cylinder 274 against the biasing force of the biasing element 290. As the result of this movement of the second master piston 276, the biasing element 290 is compressed and the hydraulic fluid is forced out of the hydraulic chamber via the second fluid port 284 into the third hydraulic line 23 to actuate the hydraulic operated device 18.

Figure 10:
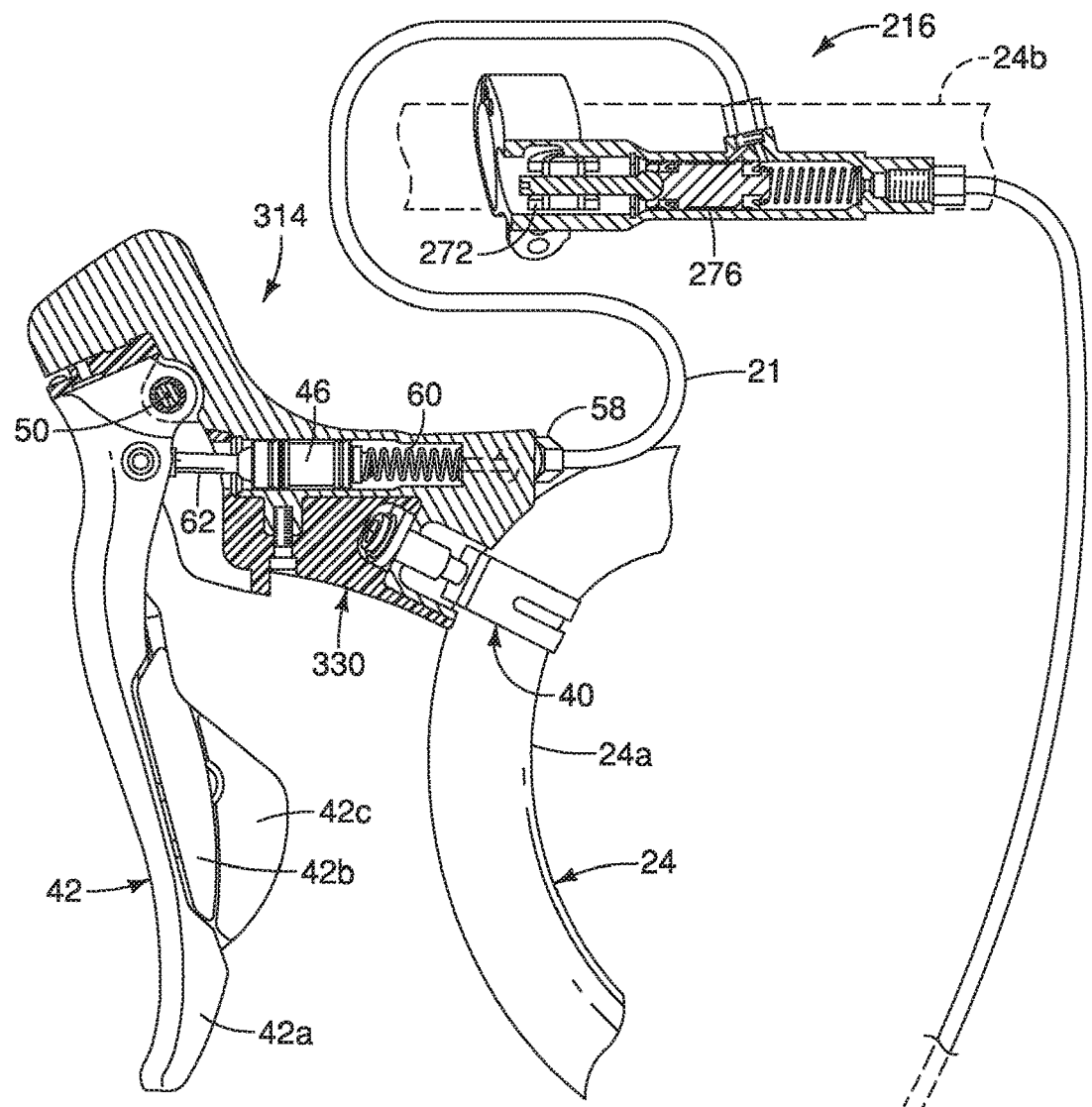
FIG. 10 is a schematic view of a bicycle hydraulic operating system having an actuating device in accordance with a fourth illustrated embodiment with selected components shown in cross section and the actuating devices in rest positions.
Figure 10:
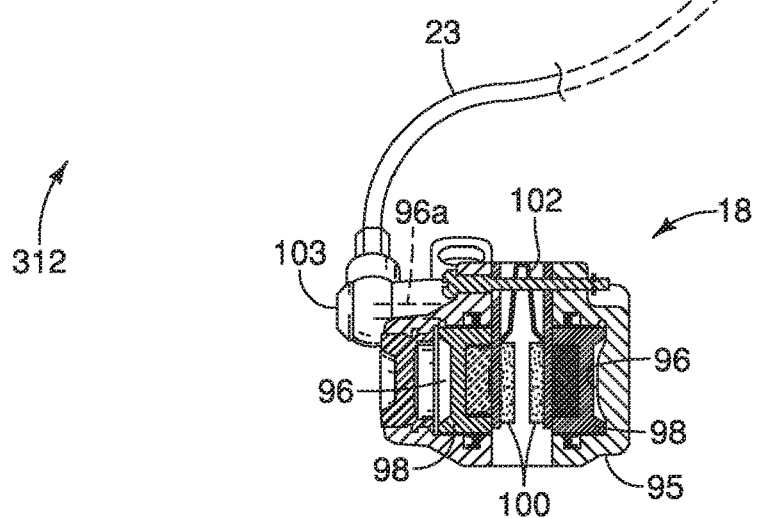

Referring now to FIG. 10, a bicycle hydraulic operating system 312 in accordance with a fourth embodiment will now be discussed. The bicycle hydraulic operating system 312 basically comprises a first actuating device 314, the second actuating device 216 of the third embodiment and the hydraulic operated device 18 of the prior embodiments. The only difference between the fourth and third embodiments is that the fourth embodiment uses the first actuating device 314 instead of the first actuating device 14. The first actuating device 314 is identical to the first actuating device 14 of the first embodiment, except that the first actuating device 314 does not have a fluid reservoir. Thus, the first actuating device 314 includes a drop handlebar bracket 330 that is identical to the drop handlebar bracket 30, except that the drop handlebar bracket 330 does not have a fluid reservoir. Similar to the third embodiment, the rider can actuate the hydraulic operated device 18 using either one of the first and second actuating devices 314 and 216. Similar to the third embodiment, the first and second actuating devices 314 and 216 are fluidly connected by the first hydraulic line 21, while the second actuating device 216 is fluidly connected to the hydraulic operated device 18 by the third hydraulic line 23.

In view of the similarity between the fourth embodiment and the prior embodiments, the bicycle hydraulic operating system 312 will only be briefly discussed for the sake of brevity. Moreover, the parts of the fourth embodiment, which are identical to the corresponding parts of the prior embodiments, will be given the same reference numbers as in the prior embodiments. Also, in the bicycle hydraulic operating system 312, the second actuating device 216 can be simply referred to as an "actuating device" and the first actuating device 314 can be simply referred to as an "additional actuating device".

Referring now to FIGS. 11 to 14, a bicycle hydraulic operating system 412 in accordance with a fifth embodiment will now be discussed. In view of the similarity between the bicycle hydraulic operating system 412 and the prior embodiments, the bicycle hydraulic operating system 412 will only be briefly discussed for the sake of brevity. Moreover, the parts of the fifth embodiment, which are identical to the corresponding parts of the prior embodiments, will be given the same reference numbers as in the prior embodiments.

The bicycle hydraulic operating system 412 basically comprises the first actuating device 14 or 314 of the first or fourth embodiment, a second actuating device 416 and the hydraulic operated device 18 of the prior embodiments. In the fifth embodiment, similar to the second, third and fourth embodiments, the second actuating device 416 has no fluid reservoir. Thus, the second actuating device 416 is constructed as a closed type hydraulic device. The first hydraulic line 21 is fluidly connected to the second actuating device 416 such that the first actuating device 14 or 314 acts as the fluid reservoir for the second actuating device 416. The third hydraulic line 23 fluidly connects the second actuating device 416 to the hydraulic operated device 18, and thus, also fluidly connects the first actuating device 14 or 314 to the hydraulic operated device 18. Thus, similar to the first embodiment, the rider can actuate the hydraulic operated device 18 using either one of the first and second actuating devices 14 and 416.

The second actuating device 416 is identical to the second actuating device 216, except as discussed below. In view of the similarity between the second actuating devices 216 and 416, the second actuating device 416 will only be partially illustrated and briefly discussed for the sake of brevity. Also, in the bicycle hydraulic operating system 412, the second actuating device 416 can be simply referred to as an "actuating device" and the first actuating device 14 or 314 can be simply referred to as an "additional actuating device".

Figure 11:
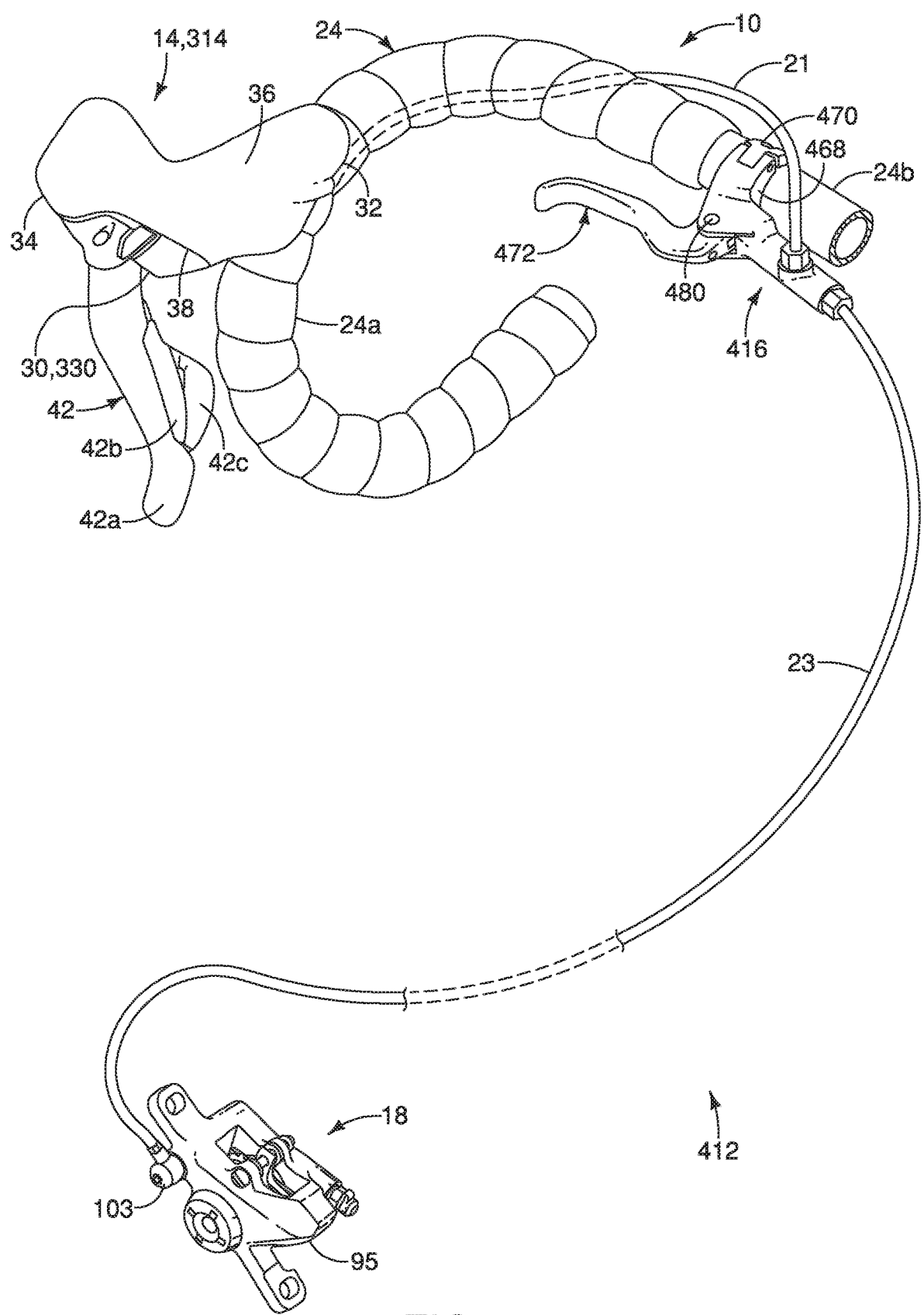
FIG. 11 is a schematic perspective view of a bicycle hydraulic operating system having an actuating device in accordance with a fifth illustrated embodiment.
Figure 12:
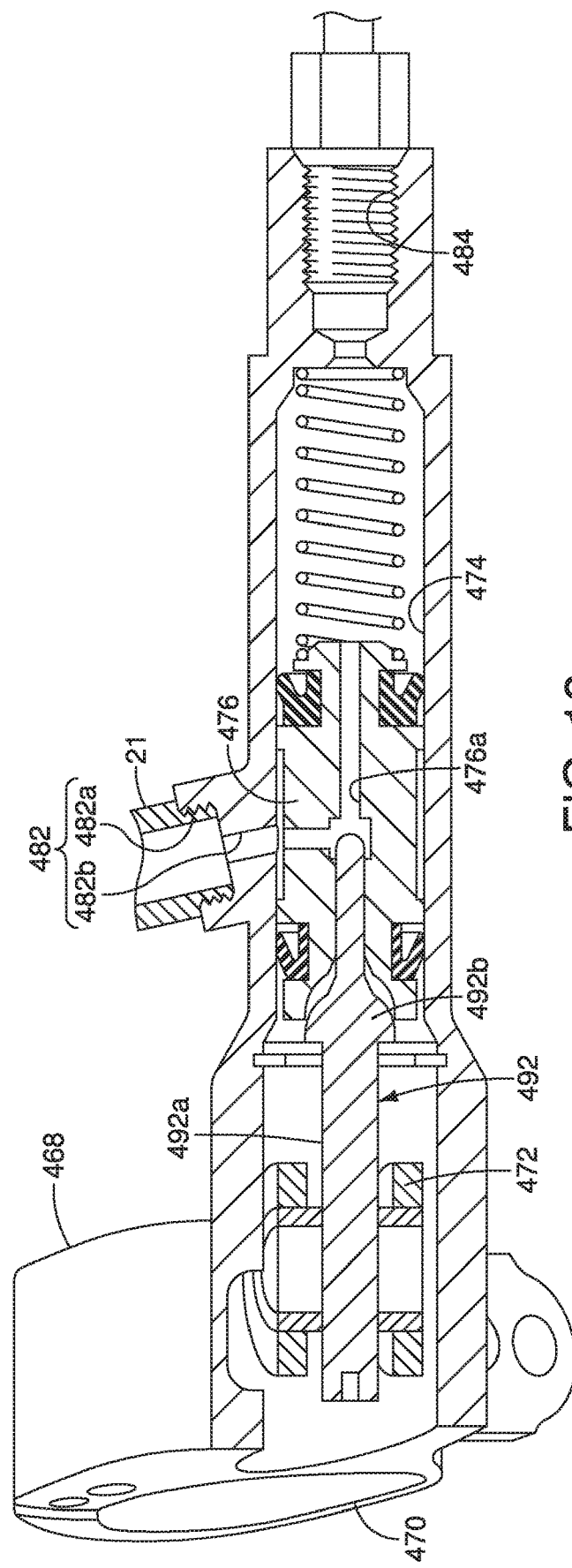
FIG. 12 is a partial cross-sectional view of the actuating device of FIG. 11 with the piston of the second actuating device in a rest position or a non-operated position.
Figure 13:
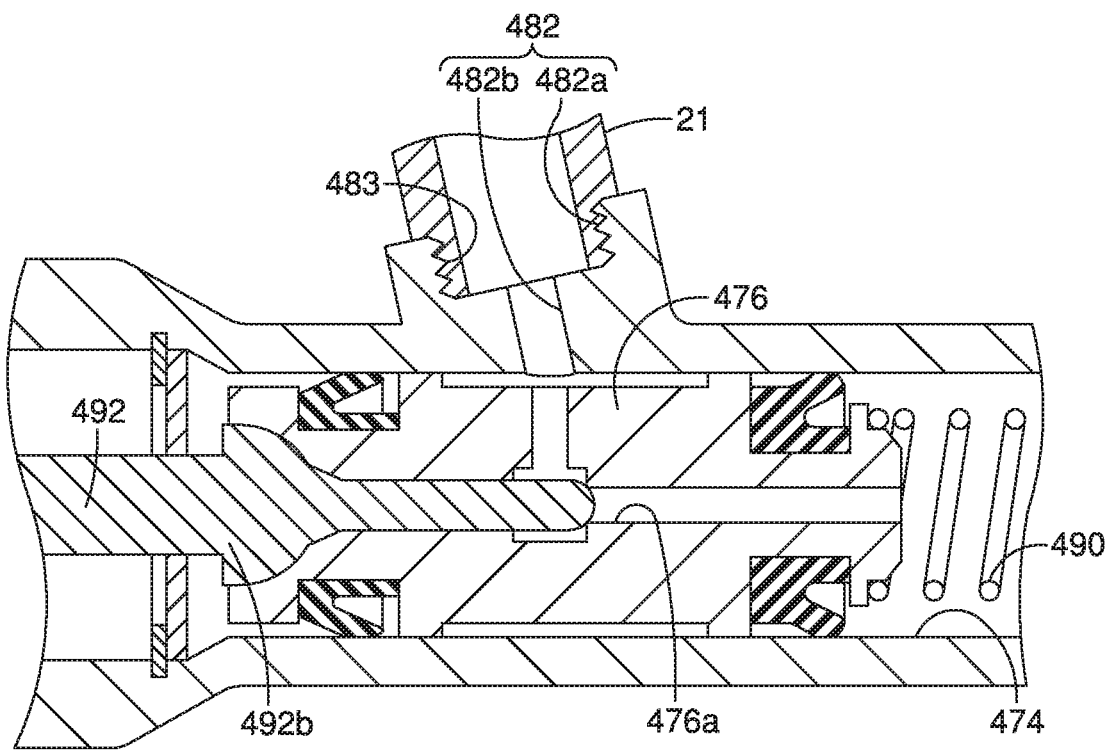
FIG. 13 is a partial cross-sectional view, similar to FIG. 12, of the actuating device, but with a push rod partially moved to block a fluid passage of a second master piston.
Figure 14:
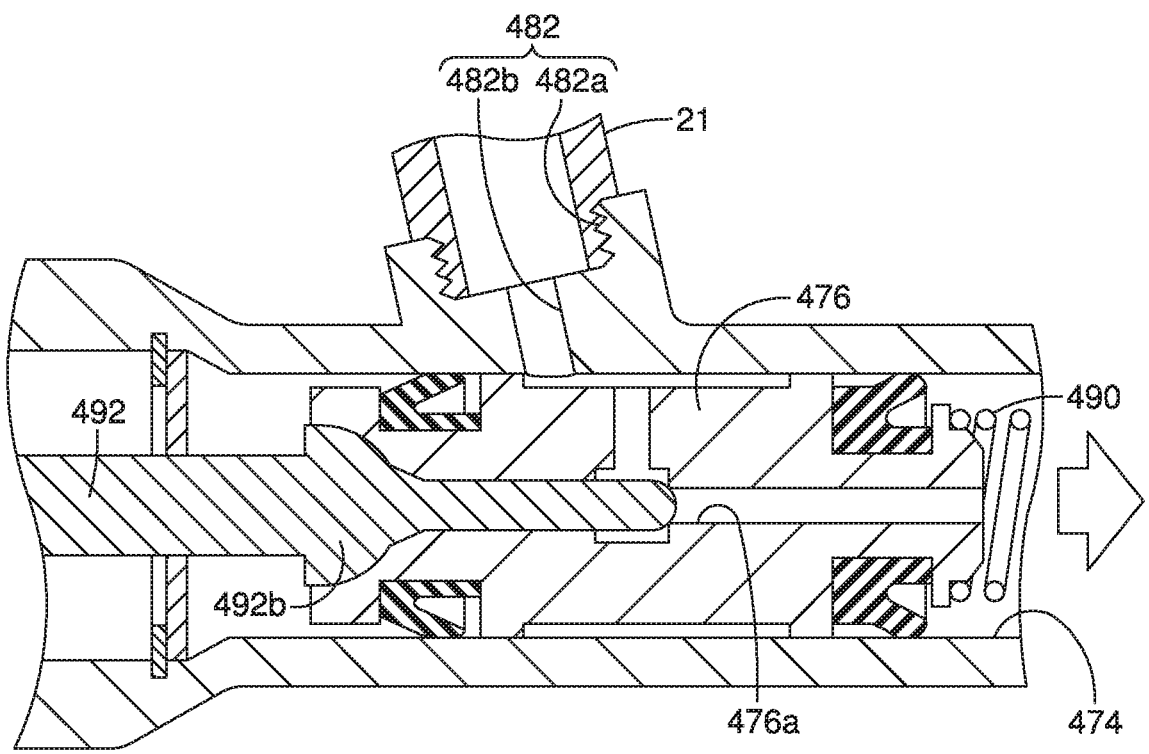
FIG. 14 is a partial cross-sectional view, similar to FIGS. 12 and 13, of the actuating device, but with a push rod fully moved to operate the disc brake caliper (i.e., a hydraulic operated device).

As seen in FIG. 11, the second actuating device 416 includes a base member 468 having an integrated handlebar clamp 470. The second actuating device 416 further includes a second operating member 472, a second master cylinder 474 and a second master piston 476. A pivot pin 480 pivotally connects the second operating member 472 to the base member 468. As seen in FIGS. 12 to 14, the second actuating device 416 further includes a connecting port 482. The connecting port 482 comprises a first diameter portion 482a configured to attach the first hydraulic line 21 via a thread 483, and a second diameter portion 482b extends from the first diameter portion 482a. The second diameter portion 482b is configured to have smaller diameter than the first diameter portion 482a. The second diameter portion 482b is provided for supplying hydraulic fluid from the first (additional) actuating device 14 or 314 to the hydraulic chamber of the second master cylinder 474. In other words, the connecting port 482 receives hydraulic fluid from the first (additional) actuating device 14 or 314. The second master cylinder 474 also has a second fluid port 484. The third hydraulic line 23 is fluidly connected to the second fluid port 484. When the first (additional) actuating device 14 or 314 and the second actuating device 416 are mounted on the handlebar 24, the first master cylinder of the first (additional) actuating device 14 or 314 is located above the second master cylinder 474.

In the second actuating device 416, a biasing element 490 is disposed in the second master cylinder 474 for biasing the second master piston 476 to the rest position. In the illustrated embodiment, the biasing element 490 is a coil compression spring (return spring) that also biases the second operating member 472 to its rest position (i.e., no external force applied to the second actuating device 416) as seen in FIGS. 11 and 12.

In this fifth embodiment, the second actuating device 416 is effectively an open system in that the first (additional) actuating device 14 or 314 supplies hydraulic fluid to the hydraulic chamber of the second master cylinder 474. In particular, the first master cylinder of the first (additional) actuating device 14 or 314 is fluidly connected to the second master cylinder 474 of the second actuating device 416 at a point upstream of the second fluid port 484 of the second actuating device 416 with respect to a flow of hydraulic fluid towards the hydraulic operated device 18.

As illustrated in FIG. 12, the second actuating device 416 further includes a push rod 492. The second operating member 472 is operatively connected to the second master piston 476 by the push rod 492. The push rod 492 has a first end 492a connected to the second operating member 472 and a second end 492b coupled to the second master piston 476. The second master piston 476 has a fluid passage 476a that fluidly connects the connecting port 482 to the second fluid port 484 through the second master piston 476 while the second operating member 472 is in the rest position as seen in FIG. 12. The fluid passage 476a of the second master piston 476 is selectively closed by the push rod in response to an operation of the second operating member 472. In more detail, as seen in FIGS. 13 and 14, the second end 492b of the push rod 492 is slidably arranged relative to the second master piston 476 during an initial stroke amount of the second operating member 472 to close the fluid passage 476a of the second master piston 476 (see, FIG. 13) and then move the second master piston 476 as the second operating member 472 is moved further past the initial stroke amount from the non-operated position (see, FIG. 14). In this way, the hydraulic fluid from the first actuating device 14 or 314 lubricates the second master piston 476 and is supplied to the second master cylinder 474. Thus, the basic operation of the second actuating device 416 is similar to the operation of the second actuating device 216 of the third and fourth embodiments.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the hydraulic operating system. Accordingly, these directional terms, as utilized to describe the hydraulic operating system should be interpreted relative to a bicycle in an upright riding position on a horizontal surface and that is equipped with the hydraulic operating system. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An actuating device for a bicycle hydraulic operating system, the bicycle hydraulic operating system including:
   an additional actuating device including an additional operating member, an additional master cylinder having an additional fluid port and an additional master piston movably arranged in the additional master cylinder in response to an operation of the additional operating member; and
   a hydraulic operated device including a slave cylinder and a slave piston movably arranged in the slave cylinder, the slave cylinder having a slave fluid port fluidly connected to the additional fluid port of the additional master cylinder such that the operation of the additional operating member moves the slave piston;
   the actuating device comprising:
   an operating member;
   a master cylinder;
   a master piston movably arranged in the master cylinder in response to an operation of the operating member; and
   a fluid port provided on the master cylinder, the fluid port being used for fluidly connecting the master cylinder to the slave fluid port such that the operation of the operating member moves the slave piston; wherein
   the actuating device has no fluid reservoir, and
   the master cylinder of the actuating device is used for being fluidly connected to the additional fluid port of the additional actuating device at a point upstream of the fluid port with respect to a flow of hydraulic fluid towards the hydraulic operated device so that the additional fluid port receives hydraulic fluid prior to the fluid port upon actuation of the additional operating member.

2. The actuating device according to claim 1, wherein
   the additional operating member includes an additional lever,
   the additional actuating device is configured to displace hydraulic fluid with a first amount as the additional lever is pivoted with a first stroke,
   the operating member includes a lever, and
   the actuating device is configured to be used for displacing hydraulic fluid with a second amount differing from the first amount as the lever is pivoted with a second stroke being same as the first stroke.

3. The actuating device according to claim 1, wherein
   the master cylinder of the actuating device further includes a connecting port, and
   the connecting port is used for selectively and fluidly connecting the additional fluid port of the additional actuating device to the slave fluid port of the hydraulic operated device in accordance with a position of the master piston of the actuating device.

4. The actuating device according to claim 3, wherein
   the connecting port comprises a first portion and a second portion,
   the first portion is used for selectively and fluidly connecting the additional fluid port to the slave fluid port in accordance with the position of the master piston, and
   the second portion is in fluid communication with a space between an outer surface of the master piston and an inner surface of the master cylinder.

5. The actuating device according to claim 1, wherein
   the actuating device further includes a connecting port and a push rod,
   the push rod operatively connects the operating member to the master piston,
   the master piston has a fluid passage that fluidly connects the connecting port to the fluid port through the master piston and is selectively blocked by the push rod in response to the operation of the operating member.

6. The actuating device according to claim 1, wherein
   the additional actuating device includes a bracket having a proximal end portion, a distal end portion and a gripping portion that is arranged between the proximal end portion and the distal end portion, and a securing member that is provided on the proximal end portion of the bracket for securing the bracket to a handlebar, the additional operating member is pivotally attached to the distal end portion; wherein
   the actuating device is configured such that the operating member extends in a lateral direction in a state where the actuating deceive is mounted to the handlebar.

7. A bicycle hydraulic operating system comprising:
   an actuating device having no fluid reservoir and including:
   an operating member;
   a master cylinder;
   a master piston movably arranged in the master cylinder in response to an operation of the operating member; and
   a fluid port provided on the master cylinder, the fluid port being used for fluidly connecting the master cylinder to the slave fluid port such that the operation of the operating member moves the slave piston;

an additional actuating device including
- an additional operating member,
- an additional master cylinder having an additional fluid port being fluidly connected to the master cylinder of the actuating device at a point upstream of the fluid port with respect to a flow of hydraulic fluid towards the hydraulic operated device so that the additional fluid port receives hydraulic fluid prior to the fluid port upon actuation of the additional operating member, and
- an additional master piston movably arranged in the additional master cylinder in response to an operation of the additional operating member; and a hydraulic operated device including a slave cylinder and a slave piston movably arranged in the slave cylinder, the slave cylinder having a slave fluid port fluidly connected to the additional fluid port of the additional master cylinder such that the operation of the additional operating member moves the slave piston.

\* \* \* \* \*